United States Patent
Bushnell et al.

(10) Patent No.: US 10,930,915 B2
(45) Date of Patent: Feb. 23, 2021

(54) COUPLING TOLERANCE ACCOMMODATING CONTACTS OR LEADS FOR BATTERIES

(71) Applicant: Apple Inc., Cupertino, CA (US)

(72) Inventors: Tyler S. Bushnell, Cupertino, CA (US); Charles W. Werley, Cupertino, CA (US); Richard M. Mank, Cupertino, CA (US); Xiaoyun Hu, Cupertino, CA (US); Thai T. Ton, Cupertino, CA (US); George V. Anastas, Cupertino, CA (US); Vijayasekaran Boovaragavan, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 897 days.

(21) Appl. No.: 14/832,683

(22) Filed: Aug. 21, 2015

(65) Prior Publication Data
US 2016/0064719 A1    Mar. 3, 2016

Related U.S. Application Data

(60) Provisional application No. 62/044,570, filed on Sep. 2, 2014.

(51) Int. Cl.
*H01M 2/22* (2006.01)
*H01M 10/42* (2006.01)
(Continued)

(52) U.S. Cl.
CPC .............. *H01M 2/22* (2013.01); *B23K 26/22* (2013.01); *B23K 26/323* (2015.10);
(Continued)

(58) Field of Classification Search
None
See application file for complete search history.

(56) References Cited

U.S. PATENT DOCUMENTS

| 3,655,455 A | 4/1972 | Jones |
| 4,369,225 A | 1/1983 | Manabe et al. |

(Continued)

FOREIGN PATENT DOCUMENTS

| CN | 1144017 | 2/1997 |
| CN | 1262790 | 8/2000 |

(Continued)

OTHER PUBLICATIONS

Zhonghua et al., "Layered Cathode Materials Li [$Ni_x Li_{(1/3-2x/3)} Mn_{(2/3-x/d)}$]$O_2$ for Lithium-Ion Batteries," *Electrochemical and Solid-State Letters*, vol. 4, No. 11, 2001, pp. A191-A194.

(Continued)

*Primary Examiner* — Jonathan Crepeau
*Assistant Examiner* — Angela J Martin
(74) *Attorney, Agent, or Firm* — Brownstein Hyatt Farber Schreck, LLP

(57) ABSTRACT

A battery assembly includes a battery cell with leads extending from the battery and a circuit including a substrate and contacts that extend from the substrate. The leads are coupled to the contacts by mechanical or adhesive bonds located on sections of the contacts extending from the substrate. In various implementations, the circuit may include a variety of different components coupled to the substrate. Such components may be operable to perform a variety of functions such as regulating, monitoring, controlling, and/or otherwise managing the battery cell. Such components may include one or more battery management units, safety circuits, capacity gauges, and/or other components.

13 Claims, 10 Drawing Sheets

(51) Int. Cl.
  *B23K 26/22* (2006.01)
  *B23K 26/323* (2014.01)
  *B23K 101/36* (2006.01)
  *B23K 103/18* (2006.01)
  *B23K 103/10* (2006.01)
  *B23K 101/38* (2006.01)

(52) U.S. Cl.
  CPC ....... H01M 10/425 (2013.01); *B23K 2101/36* (2018.08); *B23K 2101/38* (2018.08); *B23K 2103/10* (2018.08); *B23K 2103/18* (2018.08); *B23K 2103/26* (2018.08)

(56) References Cited

U.S. PATENT DOCUMENTS

| | | | |
|---|---|---|---|
| 5,134,046 | A | 7/1992 | Chow et al. |
| 5,523,179 | A | 6/1996 | Chu |
| 5,554,459 | A | 9/1996 | Gozdz et al. |
| 5,561,004 | A | 10/1996 | Bates et al. |
| 6,001,138 | A | 12/1999 | Dix |
| 6,180,278 | B1 | 1/2001 | Prickett |
| 6,200,634 | B1 | 3/2001 | Johnsgard et al. |
| 6,319,631 | B1 | 11/2001 | Bay et al. |
| 6,410,189 | B1 | 6/2002 | Yamada et al. |
| 6,610,572 | B1 | 8/2003 | Takei et al. |
| 6,632,563 | B1 | 10/2003 | Krasnov et al. |
| 6,713,987 | B2 | 3/2004 | Krasnov et al. |
| 6,893,772 | B2 | 5/2005 | Howard |
| 7,285,334 | B1 | 10/2007 | Yamashita et al. |
| 7,297,441 | B2 | 11/2007 | Hatta et al. |
| 7,585,582 | B2 | 9/2009 | Chen |
| 7,801,613 | B2 | 9/2010 | Li et al. |
| 7,811,702 | B2 | 10/2010 | Laurent et al. |
| 7,927,744 | B2 | 4/2011 | Mizutani et al. |
| 7,931,989 | B2 | 4/2011 | Klaassen |
| 7,935,439 | B2 | 5/2011 | Kim |
| 7,939,195 | B2 | 5/2011 | Salot et al. |
| 7,959,769 | B2 | 6/2011 | Zhang et al. |
| 7,960,054 | B2 | 6/2011 | Zhang et al. |
| 8,044,813 | B1 | 10/2011 | Dembo |
| 8,153,301 | B2 | 4/2012 | Jiang |
| 8,168,322 | B2 | 5/2012 | Krasnov et al. |
| 8,263,256 | B2 | 9/2012 | Hatta et al. |
| 8,293,402 | B2 * | 10/2012 | Lee ...................... H01M 2/021 429/162 |
| 8,431,264 | B2 | 4/2013 | Neudecker et al. |
| 8,435,312 | B2 | 5/2013 | Chen |
| 8,445,130 | B2 | 5/2013 | Neudecker et al. |
| 8,518,583 | B2 | 8/2013 | Mizuno et al. |
| 8,669,345 | B2 | 3/2014 | Lee et al. |
| 8,679,674 | B2 | 3/2014 | Liang et al. |
| 8,691,447 | B2 | 4/2014 | Pitts et al. |
| 8,822,059 | B2 | 9/2014 | Wang |
| 8,956,761 | B2 | 2/2015 | Reynolds et al. |
| 8,993,172 | B2 | 3/2015 | Upadhyaya |
| 9,088,050 | B2 | 7/2015 | Ueda |
| 9,209,451 | B2 | 12/2015 | Fukushima |
| 9,209,497 | B2 | 12/2015 | Elian et al. |
| 9,673,481 | B2 | 6/2017 | Sabi et al. |
| 9,911,947 | B2 | 3/2018 | Hong |
| 2001/0032666 | A1 | 10/2001 | Jenson et al. |
| 2002/0127362 | A1 | 9/2002 | Jansen et al. |
| 2003/0160589 | A1 | 8/2003 | Krasnov et al. |
| 2003/0180621 | A1 | 9/2003 | Matsumoto |
| 2004/0029001 | A1 * | 2/2004 | Yamazaki ............ H01M 2/021 429/176 |
| 2005/0079418 | A1 | 4/2005 | Kelley et al. |
| 2005/0153078 | A1 | 7/2005 | Bentley et al. |
| 2005/0211313 | A1 | 9/2005 | Sherman et al. |
| 2005/0250010 | A1 | 11/2005 | Kurihara et al. |
| 2006/0068292 | A1 | 3/2006 | Mizutani et al. |
| 2006/0210880 | A1 | 9/2006 | Howard et al. |
| 2007/0099078 | A1 | 5/2007 | Lee et al. |
| 2008/0032236 | A1 | 2/2008 | Wallace |
| 2009/0181303 | A1 | 7/2009 | Neudecker et al. |
| 2009/0193649 | A1 | 8/2009 | Niessen et al. |
| 2009/0208754 | A1 | 8/2009 | Chu et al. |
| 2009/0214899 | A1 | 8/2009 | Shakespeare et al. |
| 2009/0317708 | A1 | 12/2009 | Brandl et al. |
| 2010/0015516 | A1 | 1/2010 | Jiang |
| 2010/0035152 | A1 | 2/2010 | Sastry et al. |
| 2010/0066683 | A1 | 3/2010 | Chang et al. |
| 2011/0076550 | A1 | 3/2011 | Liang et al. |
| 2011/0123844 | A1 | 5/2011 | Bhardwaj et al. |
| 2011/0129594 | A1 | 6/2011 | Kwak et al. |
| 2011/0177398 | A1 | 7/2011 | Affinito et al. |
| 2011/0183183 | A1 | 7/2011 | Grady et al. |
| 2011/0195271 | A1 | 8/2011 | Zadesky et al. |
| 2011/0200868 | A1 * | 8/2011 | Klaassen ................ H01M 4/13 429/163 |
| 2011/0281141 | A1 * | 11/2011 | Baek .................. H01M 2/0207 429/7 |
| 2011/0294015 | A1 | 12/2011 | Pirk et al. |
| 2011/0311876 | A1 | 12/2011 | Sturgeon et al. |
| 2012/0028089 | A1 | 2/2012 | Mustakallio |
| 2012/0078317 | A1 | 3/2012 | Wang et al. |
| 2012/0088151 | A1 | 4/2012 | Yamazaki et al. |
| 2012/0100460 | A1 | 4/2012 | Chen |
| 2012/0135288 | A1 | 5/2012 | Meintschel |
| 2012/0251867 | A1 | 10/2012 | Krasnov et al. |
| 2013/0029205 | A1 | 1/2013 | Adams |
| 2013/0176654 | A1 | 7/2013 | Wang et al. |
| 2013/0344363 | A1 | 12/2013 | Upadhyaya |
| 2014/0007418 | A1 | 1/2014 | Song |
| 2014/0011067 | A1 | 1/2014 | Baba et al. |
| 2014/0147731 | A1 | 5/2014 | Anastas et al. |
| 2014/0147737 | A1 | 5/2014 | Anastas et al. |
| 2014/0147742 | A1 | 5/2014 | Anastas et al. |
| 2014/0264915 | A1 | 9/2014 | Huang et al. |
| 2014/0265915 | A1 | 9/2014 | Huang et al. |
| 2014/0272190 | A1 | 9/2014 | Huang et al. |
| 2014/0272541 | A1 | 9/2014 | Huang et al. |
| 2014/0272560 | A1 | 9/2014 | Huang et al. |
| 2014/0272561 | A1 | 9/2014 | Huang et al. |
| 2014/0273890 | A1 | 9/2014 | Huang et al. |
| 2015/0325862 | A1 | 11/2015 | Song et al. |
| 2016/0093837 | A1 | 3/2016 | Bushnell et al. |
| 2017/0309882 | A1 | 10/2017 | Anastas et al. |
| 2018/0309155 | A1 | 10/2018 | Huang et al. |

FOREIGN PATENT DOCUMENTS

| | | | |
|---|---|---|---|
| CN | 1153311 | | 6/2004 |
| CN | 101640968 | | 2/2010 |
| CN | 101676845 | | 3/2010 |
| CN | 103094512 | | 5/2013 |
| EP | 0792741 | | 9/1997 |
| EP | 0975031 | | 1/2000 |
| EP | 0975031 | A1 * | 1/2000 ............. H01M 2/02 |
| EP | 1804315 | | 7/2007 |
| EP | 2105983 | | 9/2009 |
| EP | 2481499 | | 8/2012 |
| JP | 61032951 | | 2/1986 |
| JP | 63314770 | | 12/1988 |
| JP | 2013004173 | | 1/2013 |
| JP | 2013021347 | | 1/2013 |
| TW | I 306319 | | 2/2009 |
| TW | 201010094 | | 3/2010 |
| TW | 201014020 | | 4/2010 |
| TW | 201108441 | | 3/2011 |
| TW | 201218494 | | 5/2012 |
| WO | WO 08/007867 | | 1/2008 |
| WO | WO 10/033609 | | 3/2010 |
| WO | WO 12/086557 | | 6/2012 |
| WO | WO 12/090929 | | 7/2012 |
| WO | WO 12/114162 | | 8/2012 |
| WO | WO2013/031195 | | 3/2013 |

(56) References Cited

FOREIGN PATENT DOCUMENTS

| WO | WO2018/108713 | 6/2018 |
|----|---------------|--------|
| WO | WO2019/163550 | 8/2019 |

OTHER PUBLICATIONS

U.S. Appl. No. 14/870,996, filed Sep. 30, 2015, Bushnell et al.
U.S. Appl. No. 14/040,581, filed Sep. 27, 2013, Huang et al.
U.S. Appl. No. 14/040,585, filed Sep. 27, 2013, Huang et al.
U.S. Appl. No. 14/040,592, filed Sep. 27, 2013, Huang et al.
U.S. Appl. No. 14/040,597, filed Sep. 27, 2013, Huang et al.
U.S. Appl. No. 14/040,719, filed Sep. 29, 2013, Huang et al.
U.S. Appl. No. 14/041,059, filed Sep. 30, 2013, Huang et al.
U.S. Appl. No. 14/041,773, filed Sep. 30, 2013, Anastas et al.
U.S. Appl. No. 14/041,843, filed Sep. 30, 2013, Anastas et al.
U.S. Appl. No. 14/041,921, filed Sep. 30, 2013, Anastas et al.

\* cited by examiner

COUPLING TOLERANCE ACCOMMODATING CONTACTS OR LEADS FOR BATTERIES

CROSS-REFERENCE TO RELATED APPLICATION

This application is a non-provisional patent application of and claims the benefit to U.S. Provisional Patent Application No. 62/044,570, filed Sep. 2, 2014 and titled "Coupling Tolerance Accommodating Contacts or Leads for Batteries," the disclosure of which is hereby incorporated herein by reference in its entirety.

TECHNICAL FIELD

This disclosure relates generally to batteries, and more specifically to contacts and/or leads for batteries that accommodate coupling tolerances.

BACKGROUND

Many electronic devices such as smart phones, laptop computers, tablet computers, digital media players, and so on include one or more battery assemblies for providing power to one or more components. Often, such battery assemblies include one or more battery cells such as one or more jelly roll cells with leads extending from the cells. In many instances, such leads may be coupled to one or more contacts of one or more circuits that include components operable to regulate, monitor, control, and/or otherwise manage the battery cells. Such components may include one or more battery management units, safety circuits, gas gauges, and/or other components.

Connection of battery cell leads to circuit contacts, which may be performed using various processes such as welding, may be subject to a variety of tolerances. For example, the battery cell leads and the circuit contacts may be aligned during coupling. Particularly in cases where such leads and contacts are small in size, the leads and contacts may be aligned in preparation for and during coupling. Alignment tolerances may be influenced by the dimensions, geometry, and/or positioning of the leads and/or contacts; in which the leads and/or contacts may be moved in preparation for and during coupling while still being aligned such that the leads and contacts may be coupled. Failure to remain within such alignment tolerances during coupling may result in failure to couple the leads and contacts.

SUMMARY

The present disclosure discusses battery assemblies and methods for manufacturing battery assemblies with contacts and/or leads to provide greater coupling tolerances. In various embodiments, a battery assembly may include a battery cell with leads extending from the battery, a circuit formed on a substrate, and contacts that extend from the substrate. The leads may be coupled to the contacts by mechanical or adhesive bonds (which may be electrically conductive) located on sections of the contacts positioned off of the substrate. In various implementations, the circuit may include a variety of different components coupled to the substrate. Such components may be operable to perform a variety of functions such as regulating, monitoring, controlling power output from, and/or otherwise managing the battery cell. Such components may include one or more battery management units, safety circuits, capacity gauges, and/or other components.

In various embodiments, a battery assembly may include a battery cell with leads extending from the battery and a circuit having a substrate and contacts that are coupled to the substrate and extend from the substrate. The leads may be coupled to the contacts by mechanical or adhesive bonds located on sections of the contacts positioned off of the substrate.

In one or more embodiments, a battery assembly may include a battery cell with leads extending from the battery that each include a narrow section where the respective lead is coupled to the battery cell and a wide section and a circuit having a substrate and contacts that are coupled to the substrate. The leads may be coupled to the contacts by mechanical or adhesive bonds located on the wider sections of the leads.

In various embodiments, a method for manufacturing a battery assembly may include extending leads from a battery cell; forming a circuit by coupling contacts to a substrate such that the contacts extend from the substrate; and coupling the leads to the contacts by mechanical or adhesive bonds located on sections of the contacts extending from the substrate.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
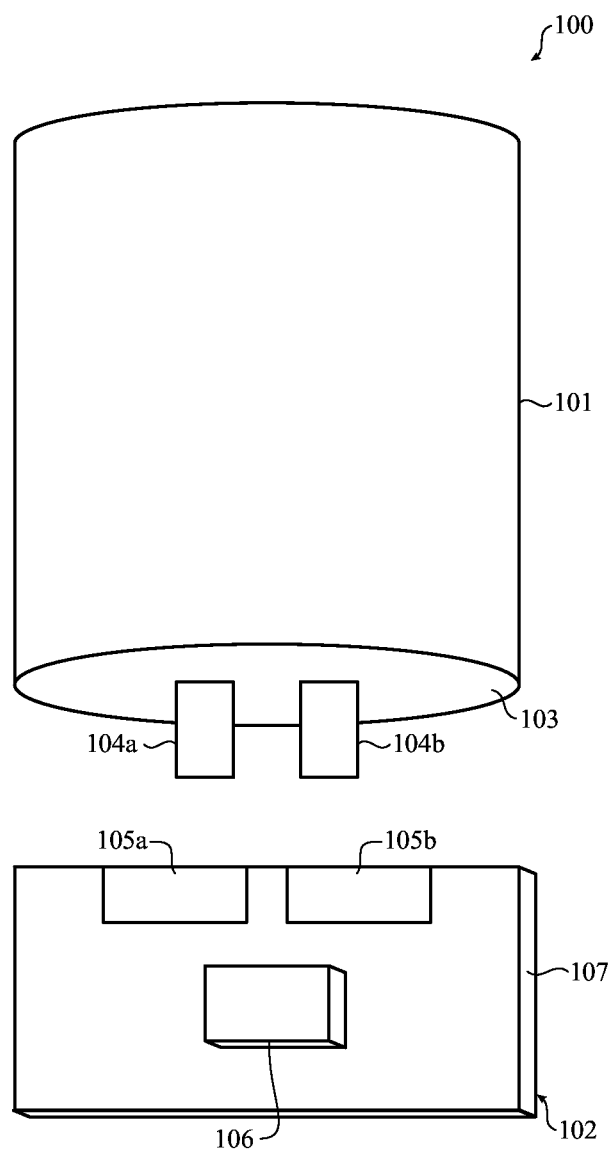
FIG. 1 is a schematic, isometric view of a first example of a battery assembly.

The description that follows includes sample systems, methods, and apparatuses that embody various elements of the present disclosure. However, it should be understood that the described disclosure may be practiced in a variety of forms in addition to those described herein.

The present disclosure discloses battery assemblies and methods for manufacturing battery assemblies with coupling tolerance accommodating contacts and/or leads. In various implementations, leads of a battery cell may be connected to contacts on a substrate. In certain embodiments, a battery assembly may include a battery cell (such as a jellyroll battery cell, a stack-cell battery, and/or any other battery cell structure) or cells with leads extending from the battery and a circuit including a substrate (such as a printed circuit board) and contacts that may or may not extend from the substrate. The leads may be coupled to the contacts by mechanical or adhesive bonds (which may be electrically conductive), such as welds formed by laser and/or other welding, located on sections of the contacts positioned off of the substrate.

In various implementations, the contacts may include a narrow section and a wide section with respect to a width of the contact. The terms "narrow" and "wide" are intended to indicate relative dimensions of the sections with respect to one another. The respective contact may be coupled to the substrate at a portion of the narrow section and the respective lead may be coupled to a portion of the wide section and/or the narrow section. In some embodiments, the contacts may be L-shaped (or other shapes that may or may not include curvature such as a "T" shape, a "U" shape, a "C" shape, a "Y" shape, and/or other shapes) with one portion of the "L" being the narrow section and the other the wide section. This may allow the portion of the contacts extending from of the substrate to have a larger area, thereby creating alignment tolerances, while allowing the sections of the contacts positioned on the substrate to be smaller and thus occupy less area on the substrate. This may enable use of circuits with smaller dimensions or free space on the substrate for other components.

In some implementations, the contacts may each extend from the substrate at a non-right angle with respect to an edge of the substrate. Angling the contacts may enable the sections positioned on the substrate to be smaller while the leads may be coupled to the contacts anywhere along the angled region, thus allowing increasing tolerance for alignment of the leads with the contacts.

In various implementations, one or more of the leads may be formed of a first material while the contacts are formed from a second material. Generally, the melting point of the first material may be lower than the melting point of the second material. The lead may be formed from aluminum and the contact from nickel, as one example. If the mechanical or adhesive bond is a laser weld located on sections of the contacts positioned on the substrate, the laser welds may be formed through the leads placed on the contacts. Coating or cladding the nickel contact in aluminum may facilitate binding of the contacts and leads. The weld may be located on a section of the contact positioned off of the substrate; and sections of the contacts may be folded or placed over the leads such that the laser weld may be formed through the contacts and modification of the material of the leads may not be performed. Although laser welding is discussed, it is understood that this is not intended to be limiting and other coupling techniques may be used such as ultrasonic welding, conventional welding, soldering, and so on.

In some implementations, the leads may define a narrow section and a wide section with respect to a width of the respective lead. A portion of the narrow section may be coupled to the battery cell and a portion of the wide section and/or the narrow section may be coupled to the respective contact. Such leads may be used in other battery assemblies including conventional battery assemblies.

In various implementations, the circuit may include a variety of different components coupled to the substrate. Such components may be operable to perform a variety of functions such as regulating, monitoring, controlling, and/or otherwise managing the battery cell. Such components may include one or more battery management units (BMUs), safety circuits, capacity gauges, and/or other components.

In some implementations the leads and/or contacts may be otherwise configured to further accommodate tolerances and/or alternative designs. For example, the leads may extend from various surfaces of the battery. The leads may be bent after coupling which may bring the battery cell and circuit into closer proximity and/or position the circuit with respect to the battery cell in such a manner to as to reduce the overall area and/or volume occupied by the battery and circuit, protect the battery cell and/or the circuit, and so on. In some cases, the leads and/or bonds where leads and contacts are coupled may also bend along multiple axes.

In some cases, the leads and/or contacts may intersect and/or cross when coupled. In such cases the leads and/or contacts may be insulated from each other prior to coupling, during coupling, and/or after coupling. In various cases, excess portions of the leads and/or contacts that are not part of the coupling may be cut, trimmed, folded, and/or otherwise repositioned prior to coupling, during coupling, and/or after coupling in order to reduce occupied space and/or for other purposes.

FIG. 1 is a schematic, isometric view of a first example of battery assembly 100. As illustrated, a battery cell 101 may include leads 104a and 104b extending from a front surface 103. As also illustrated, a circuit 102 may include a substrate 107 (such as a printed circuit board) with one or more components 106 and contacts 105a and 105b coupled thereto.

As shown, contacts 105a and 105b are positioned entirely on the substrate 107 and have dimensions larger than those of the leads 104a and 104b. This dimensional difference may enable the leads to be positioned in larger number of different locations on the contacts for coupling than if the contacts had the same dimensions as the leads, thus accommodating a greater alignment tolerance for coupling the leads and the contacts. However, this may result in the contacts occupying a larger percentage of the surface area of the substrate, leaving less surface area for component(s) 106 and/or requiring a larger substrate than might otherwise be utilized.

Figure 2A:
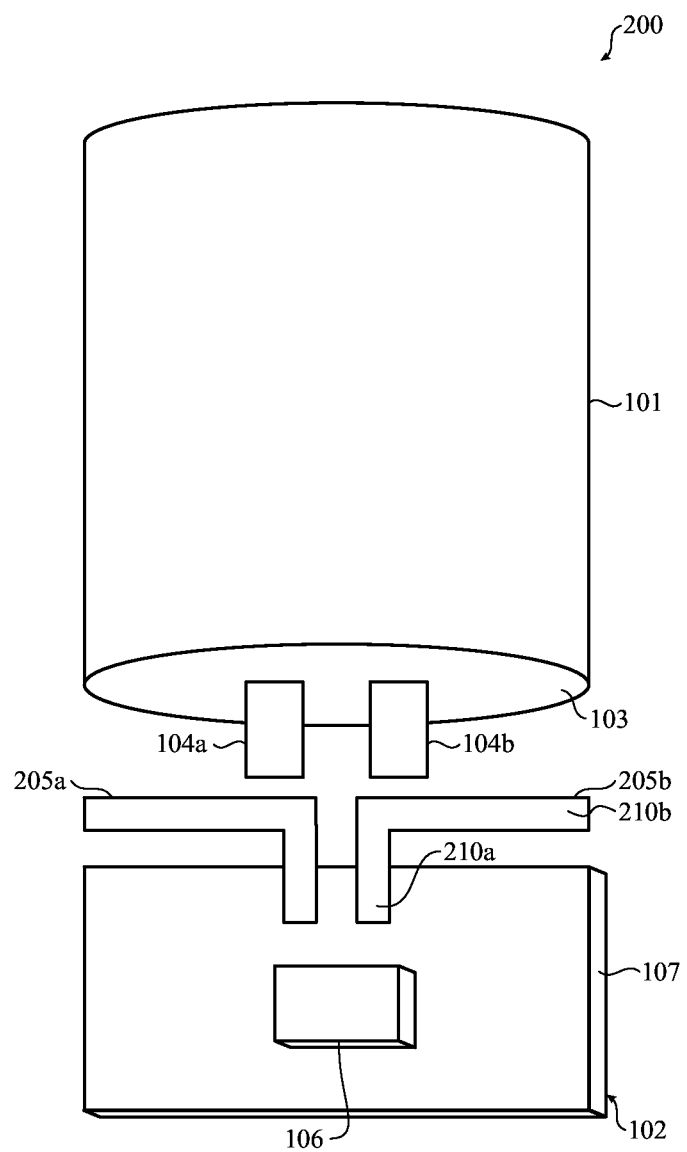
FIG. 2A is a schematic, isometric view of a second example of a battery assembly.

FIG. 2A is a schematic, isometric view of a second example of a battery assembly 200. By way of contrast with the first example battery assembly 100 of FIG. 1, the contacts 205a and 205b extend from the substrate 107. The portions of the sections 210a of the contacts 205a and 205b that extend from the substrate are narrower than those of the contacts 105a and 105b of FIG. 1. Additionally, the portions of the sections 210a are narrower than the portions of the sections 210b that extend from the substrate, though this may not be the case in various embodiments. As shown, the contacts 205a and 205b are L-shaped with one portion of the "L" being the narrower section and the other the wide section with respect to the width of the contacts 205a and 205b. As the leads 104a and 104b may be positioned at any number of locations on the sections 210b, the alignment tolerance is substantially increased over the first example battery assembly 100 of FIG. 1 while the sections 210a positioned on the substrate occupy substantially less surface area of the substrate. This may enable use of a smaller substrate and/or allow more of the surface area of the substrate to be used for the component(s) 106.

Figure 2B:
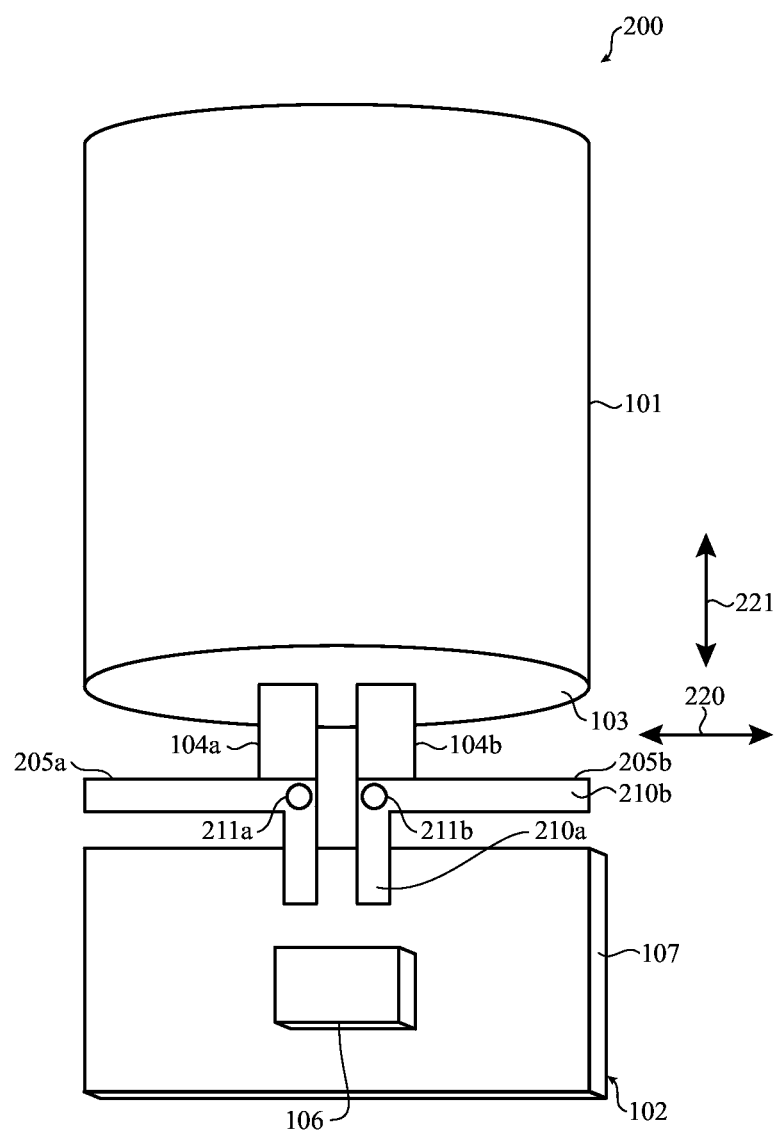
FIG. 2B illustrates coupling of the components of the second example battery assembly of FIG. 2A.

FIG. 2B illustrates coupling of the leads 104*a* and 104*b* to the contacts 205*a* and 205*b* by mechanical or adhesive bonds 211*a* and 211*b*, respectively, at selected locations on the sections 210*b* of the contacts 205*a* and 205*b*. The mechanical or adhesive bonds may be welds, such as laser welds.

In various implementations, one or more of the leads 104*a* and 104*b* may be formed of a first material with a lower melting point than a second material from which one or more of the contacts 205*a* and 205*b* are formed (such as aluminum and nickel, respectively). If a laser weld is formed on one or more of leads placed over one or both of the sections 210*a* of the welding leads 205*a* and/or 205*b* positioned on the substrate 107, due to the differences in the relative melting points of the materials, the first material may be modified, such as by cladding the first material in the second material. However, by locating the laser weld on the sections 210*b*, the leads may be folded over or placed under one or both of the welding leads 205*a* and/or 205*b* and the laser weld may be formed thereupon. As such, modification of the material of the leads may not be performed.

As shown the sections 210*b* of the contacts 205*a* and 205*b* extend as far as the outside edges of the substrate 107. However, it is understood that this is an example and that in various implementations the sections 210*b* may extend further than the outside edges of the substrate or may not extend to the outside edge of the substrate without departing from the scope of the present disclosure.

As illustrated, the circuit may include one or more components 106 that may be operable to perform a variety of functions such as regulating, monitoring, controlling, and/or otherwise managing the battery cell 101. Such components may include one or more battery management units (BMUs), safety circuits, capacity gauges, and/or other components.

Figure 2C:
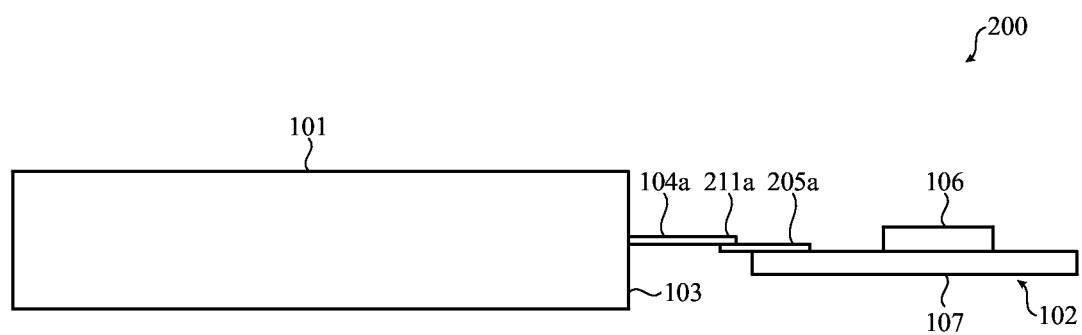
FIG. 2C illustrates a side plan view of the coupled components of the second example battery assembly of FIG. 2B.
Figure 2D:
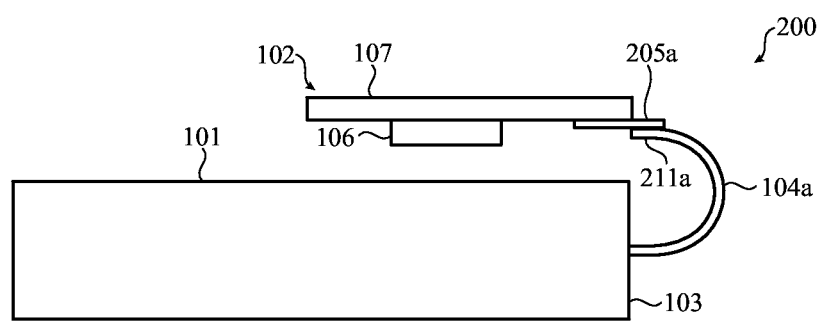
FIG. 2D illustrates the view of FIG. 2C after the leads are bent along a first axis, positioning the circuit above the battery cell.

FIG. 2C illustrates a side plan view of the coupled components of the second example battery assembly 200 of FIG. 2B. In various implementations, the leads 104*a* and/or 104*b* may be bent after (and/or before) coupling. This bending may bring the battery cell 101 and circuit 102 into closer proximity and/or variously position the circuit with respect to the battery cell to reduce space occupied, protect the battery cell and/or the circuit, and so on. For example, FIG. 2D illustrates the coupled second battery assembly 200 of FIG. 2C after the leads are bent along a first axis 220 (see FIG. 2B), positioning the circuit above the battery cell. Although bending of the leads is illustrated and described, in some implementations the contacts 205*a* and 205*b* and/or the mechanical or adhesive bonds 211*a* and 211*b* may be bent.

Figure 2E:
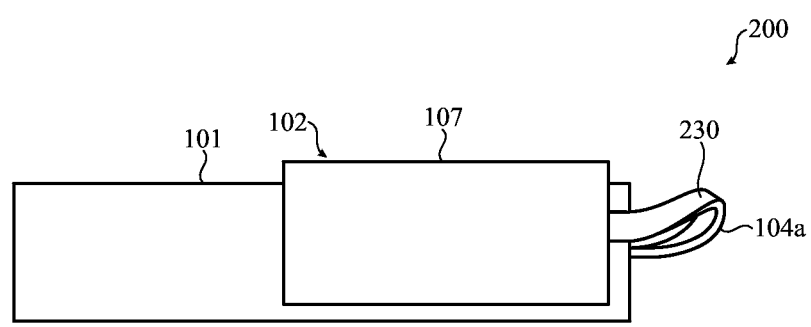
FIG. 2E illustrates the view of FIG. 2D after the leads are bent along a second axis, twisting the leads to position the circuit to the side of the battery cell.

In various cases, the leads 104*a* and/or 104*b* (and/or the contacts 205*a* and 205*b* and/or the mechanical or adhesive bonds 211*a* and 211*b*) may be configured to bend along multiple axes that extend in different directions. FIG. 2E illustrates the view of FIG. 2D after the leads are bent along a second axis 221 (see FIG. 2B), twisting the leads at a twist 230 to position the circuit 102 to the side of the battery cell 101. In some cases, portions of the leads may be bent to fold over the contacts 205*a* and 205*b* and/or portions of the contacts may be bent to fold over the leads. Such folding may reduce the volume and/or space occupied by the leads or contacts and/or increase the strength or durability of the coupling. Such folding may be performed before, during, or after coupling.

Although the second example battery assembly 200 is illustrated and described with particular components configured in a particular arrangement (such as leads formed as leads 104*a* and 104*b*, contacts formed as contacts 205*a* and 205*b*), it is understood that this is an example. In various implementations other numbers of components configured in other arrangements may be utilized without departing from the scope of the present disclosure.

For example, the leads 104*a* and 104*b* and the contacts 205*a* and 205*b* are shown as not intersecting and/or crossing at any point between the battery cell 101 and the circuit 102. However, in some cases the leads of a battery cell and/or contacts of a circuit may intersect and/or cross at one or more points before, during, or after coupling. In such cases, the leads and/or contacts at such points and/or other points may be insulated from each other. Such insulation may be applied and/or configured prior to coupling, during coupling, and/or after coupling.

In various cases, excess portions of the leads and/or contacts that are not part of the coupling may be cut, trimmed, folded, and/or otherwise repositioned prior to coupling, during coupling, and/or after coupling. Such procedures may reduce occupied space and/or for other purposes. For example, FIG. 2B illustrates the mechanical or adhesive bonds 211*a* and 211*b* as only occupying a small portion of the sections 210*b* of the contacts 205*a* and 205*b*. The remaining portions of the sections 210*b* after coupling may be cut away and/or folded over the mechanical or adhesive bonds in order to occupy less space and/or make room for other components.

Figure 3:
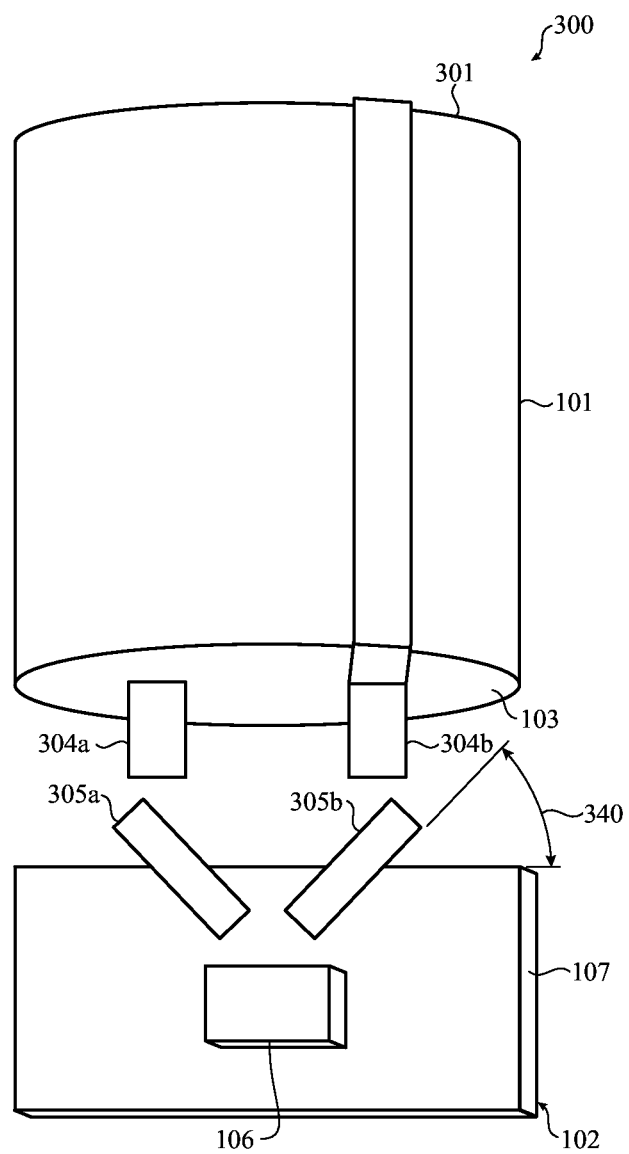
FIG. 3 is a schematic, isometric view of a third example of a battery assembly.

FIG. 3 is a schematic, isometric view of a third example of a battery assembly 300. By way of contrast with the first example battery assembly 100 of FIG. 1, the contacts 305*a* and 305*b* extend from the substrate 107 at a non-right angle 340 with respect to the edge of the substrate. The sections of the contacts 305*a* and 305*b* that are positioned on the substrate are narrower than those of the contacts 105*a* and 105*b* of FIG. 1. Although the contacts 305*a* and 305*b* are illustrated and described as extending from the substrate 107 at a non-right angle, it is understood that this is an example. In various implementations, the contacts may be curved, the contacts may extend at different non-right angles than each other, and so on without departing from the scope of the present disclosure. Further, in various implementations the leads 304*a* and 304*b* may extend from the battery cell 301 at a non-right angle, the leads be curved, the leads may extend at different non-right angles than each other, and so on without departing from the scope of the present disclosure.

By angling the contacts 305*a* and 305*b*, the number of locations where the leads 304*a* and 304*b* may be positioned on the sections of the contacts 305*a* and 305*b* positioned off the substrate for coupling may be increased as compared with a perpendicular arrangement regarding to the substrate outside edge. This may substantially increase the alignment tolerance over the first example battery assembly 100 of FIG. 1 while the sections positioned on the substrate occupy substantially less surface area of the substrate. This may enable use of a smaller substrate and/or allow more of the surface area of the substrate to be used for the component(s) 106.

Further, the lead 304*b* is shown as extending from a back surface 301 of the battery cell 101 and is configured to project in the same orientation as the lead 304*a* by being bent and run across the top of the battery down past the front surface 103. However, it is understood that this configuration of the leads 304*a* and 304*b* is optional and any battery cell described herein may be utilized with the contacts 305*a* and 305*b*. In some cases the portion of the lead 304*b* running across the battery cell may be insulated.

Figure 4:
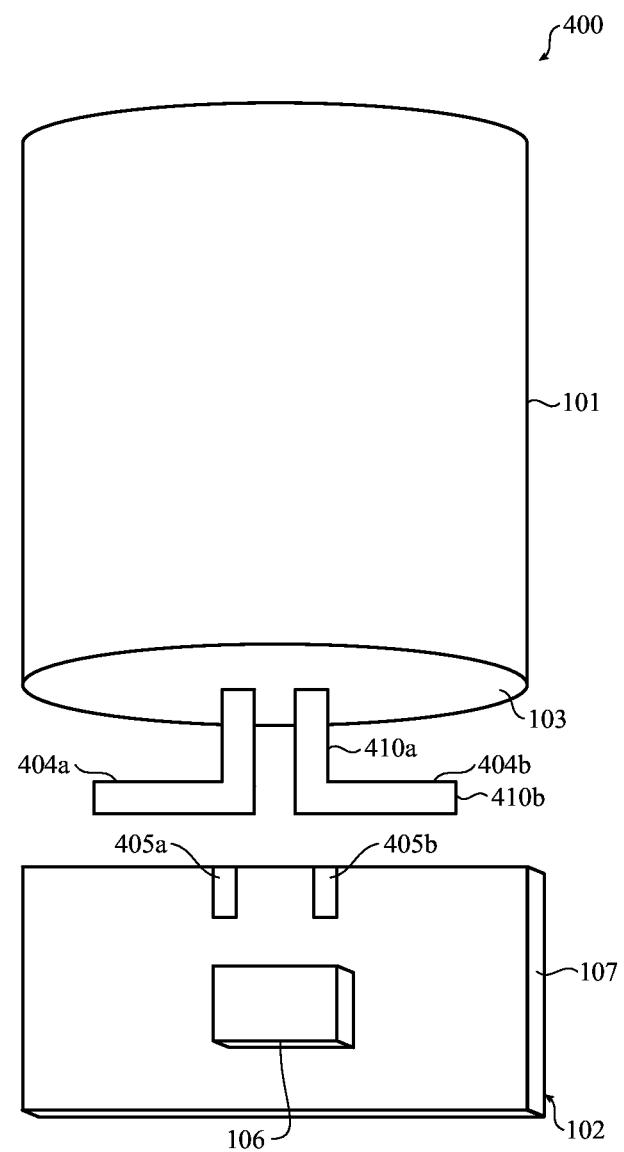
FIG. 4 is a schematic, isometric view of a fourth example of a battery assembly.

FIG. 4 is a schematic, isometric view of components of a fourth example of a battery assembly 400. By way of contrast with the first example battery assembly 100 of FIG. 1, The sections 410*a* of the leads 404*a* and 404*b* extend from the front surface 103 of the battery cell 101 are narrower than the sections 410*b*. As shown, the leads 404*a* and 404*b* are L-shaped. Further, the contacts 405*a* and 405*b* positioned on the substrate 107 are narrower than those of the contacts 105*a* and 105*b* of FIG. 1. As any portion of the section 410*b* of the leads 404*a* and 404*b* may be positioned on the contacts 405*a* and 405*b* for coupling, the alignment tolerance is substantially increased over the first example battery assembly 100 of FIG. 1 while the contacts 405*a* and 405*b* occupy substantially less surface area of the substrate. This may enable use of a smaller substrate and/or allow more of the surface area of the substrate to be used for the component(s) 106. Additionally, in some implementations the substrate 107 may include circuit traces and/or other components positioned under portions of the leads 404*a* and 404*b* that are not coupled to the contacts 405*a* and 405*b*. In such implementations, insulative material may be positioned under such portions of the leads 404*a* and 404*b* and/or over the circuit traces and/or other components to prevent interference between the portions of the leads 404*a* and 404*b* and the circuit traces and/or other components.

Although the L-shaped leads 404*a* and 404*b* are illustrated and described as being used in an embodiment where the contacts 405*a* and 405*b* do not extend from the substrate 107, it is understood that this is an example. In various implementations, such leads may be used in battery assemblies including circuits where the contacts extend from the substrate (such as the example battery assemblies 200 and 300 of FIGS. 2A-2E and 3.

Figure 5:
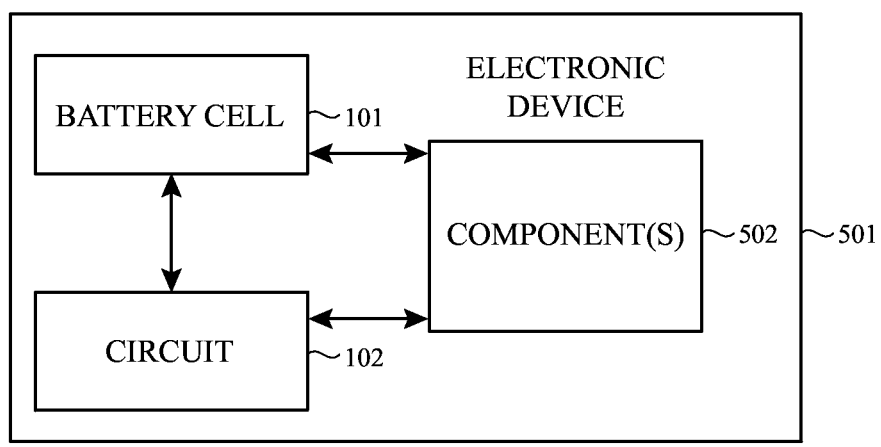
FIG. 5 is a block diagram illustrating incorporation of a battery assembly including a battery cell and associated circuit into an electronic device.

FIG. 5 is a block diagram illustrating incorporation of a battery assembly (Such as the battery assemblies 200, 300, and/or 400 of FIGS. 2A-2E, 3, and/or 4) including a battery cell 101 and associated circuit 102 into an electronic device 501. The electronic device may be a laptop computer, a mobile computer, a smart phone, a cellular telephone, a tablet computer, a digital media player, a wearable device, an electronic kitchen appliance, a display, an accessory, and/or any other electronic device.

As shown, the battery cell 101 and/or the circuit 102 may be connected to one or more electronic components 502 of the electronic device 501. Such electronic components may include one or more processing units, one or more communication components, one or more input/output components, one or more non-transitory storage media (which may take the form of, but is not limited to, a magnetic storage medium; optical storage medium; magneto-optical storage medium; read only memory; random access memory; erasable programmable memory; flash memory; and so on), and/or any other such components. In various cases, the component may utilize power provided by the battery cell.

Figure 6:
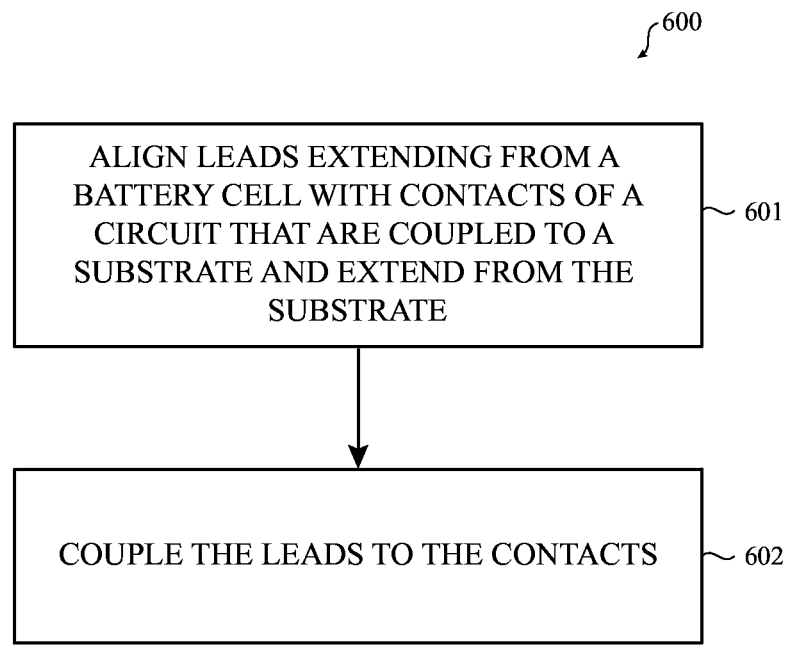
FIG. 6 is a method diagram illustrating a method for manufacturing a battery assembly. This method may manufacture the battery assembly of FIGS. 2A-2E and/or 3.

FIG. 6 is a method diagram illustrating a method 600 for manufacturing a battery assembly. This method may manufacture the battery assembly of FIGS. 2A-2E and/or 3.

The flow may begin at block 601 where leads extending from a battery cell are aligned with contacts of a circuit that are coupled to a substrate and extend from the substrate.

The flow may then proceed to block 602 where the leads may be coupled to the contacts. In some implementations, the coupling may include forming mechanical or adhesive bonds that may be located on sections of the contacts positioned off of the substrate.

In some implementations, such a coupling operation may include laser welding the contacts to the leads (and/or the leads to the contacts). In various implementations, laser welding the contacts to the leads may include laser welding a nickel contact to an aluminum lead (and/or other combinations of materials where the material forming the contact melts at a higher temperature than the material forming the lead) through a surface of the nickel contact. In still other implementations, the coupling operation may include selecting coupling locations on the contacts out of a number of different possible coupling locations.

Although the method 600 is illustrated and described above as including particular operations performed in a particular order, it is understood that this is an example. In various implementations, various orders of the same, similar, and/or different operations may be performed without departing from the scope of the present disclosure.

For example, in various implementations the method 600 may include the additional operation of bending the leads. Such bending may alter the position of the circuit with respect to the battery cell. Further, such bending may bend the leads along multiple axes. In various cases, the contacts may be bent in addition to and/or instead of bending the leads.

By way of another example, the method 600 is illustrated and described at block 602 as forming the circuit by coupling contacts to a substrate such that the contacts extend from the substrate. However, in various cases the contacts coupled to the substrate may not extend from the substrate. In such implementations, the leads extending from the battery cell may be shaped such that sections of the leads are wider than sections coupled to a surface of the battery cell and/or may extend from the surface of the battery at an acute angle with respect to the surface of the battery. In some implementations, the leads may be L-shaped.

Although the present disclosure has been described above and illustrated in the accompanying figures in the context of multiple leads and multiple contacts, it is understood that these are examples. In various cases, the techniques of the present disclosure may be utilized in embodiments with a single lead and/or a single contact without departing from the scope of the present disclosure.

As discussed above and illustrated in the accompanying figures, the present disclosure discloses battery assemblies and methods for manufacturing battery assemblies with coupling tolerance accommodating contacts and/or leads. In various embodiments, a battery assembly may include a battery cell (such as a jellyroll battery cell) with leads extending from the battery and a circuit including a substrate (such as a printed circuit board) and contacts that extend from the substrate. The leads may be coupled to the contacts by mechanical or adhesive bonds, such as welds formed by laser and/or other welding, located on sections of the contacts positioned off of the substrate.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

A computer program product, or software, that may include a non-transitory machine-readable medium having stored thereon instructions, may be used to program a computer manufacturing system (or other electronic devices) to construct battery assemblies and/or electronic devices including such battery assemblies according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A battery assembly, comprising:
    a battery cell with leads extending directly from the battery; and
    a circuit, comprising:
        a substrate; and
        contacts that each include a first portion coupled to the substrate and a second portion extending from the first portion, the second portion coplanar with the first portion;
    wherein the leads are affixed directly to the second portions of the contacts.
2. The battery assembly of claim 1, wherein the contacts each include:
    a narrow section with respect to a width of the respective contact; and
    a wide section with respect to the width of the respective contact.
3. The battery assembly of claim 2 wherein a portion of the narrow section is coupled to the substrate and at least one of the leads is affixed to the wide section.
4. The battery assembly of claim 1, wherein at least one of the contacts is L-shaped.
5. The battery assembly of claim 1, wherein at least one of the contacts extends from the substrate at a non-right angle with respect to an edge of the substrate.
6. The battery assembly of claim 1, wherein the leads are affixed to the contacts by at least one of welds, laser welds, soldering, or ultrasonic welds.
7. The battery assembly of claim 1, wherein:
    one of the leads comprises an aluminum lead;
    one of the contacts comprises a nickel contact; and
    the aluminum lead is laser welded directly to the nickel contact through a surface of the nickel contact.
8. The battery assembly of claim 1, wherein each of the leads include a narrow section with respect to a width of the battery cell and a wide section with respect to the width of the battery cell.
9. The battery assembly of claim 1, wherein the leads extend from different surfaces of the battery.
10. The battery assembly of claim 1, wherein at least one of the leads is bent after affixing to the contacts.
11. The battery assembly of claim 10, wherein the at least one of the leads is bent along multiple axes that extend in different directions.
12. The battery assembly of claim 1, wherein the circuit further comprises at least one of a battery management unit coupled to the substrate, a safety circuit coupled to the substrate, or a gas gauge coupled to the substrate.
13. The battery assembly of claim 2, wherein a portion of the narrow section is coupled to the substrate and one and only one of the leads is affixed to the wide section.

* * * * *